UNITED STATES PATENT OFFICE.

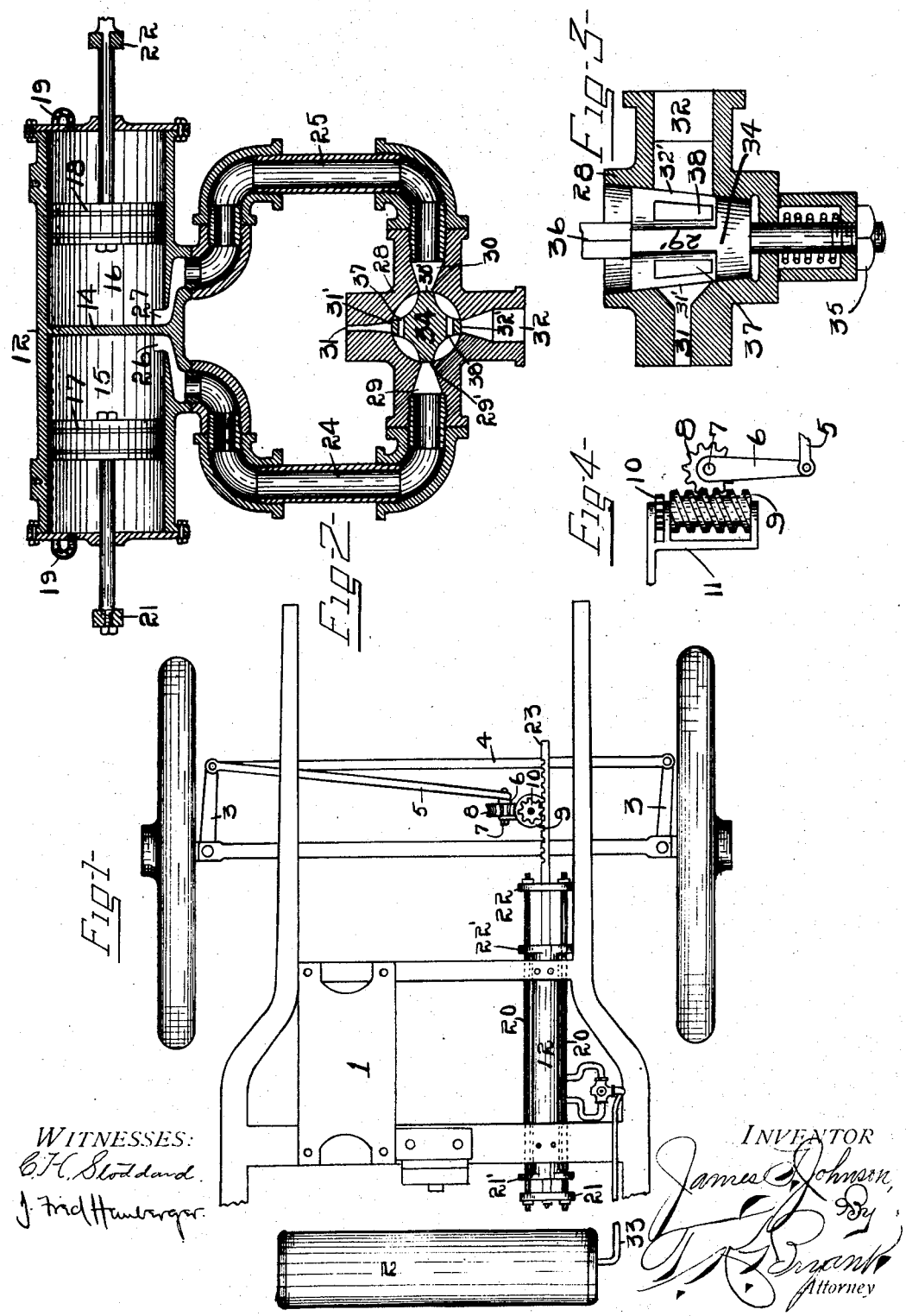

JAMES T. JOHNSON, OF MEMPHIS, TENNESSEE.

AIR GUIDE OR STEERING DEVICE FOR AUTOMOBILES.

No. 872,820.        Specification of Letters Patent.        Patented Dec. 3, 1907.

Application filed October 8, 1906. Serial No. 337,909.

*To all whom it may concern:*

Be it known that JAMES T. JOHNSON, a citizen of the United States, residing at Memphis, in the county of Shelby and State of Tennessee, has invented certain new and useful Improvements in Air Guide or Steering Devices for Automobiles, of which the following is a specification.

This invention relates to certain new and useful improvements in automobile steering device, and the primary object of the invention is to provide a fluid-operated means for actuating the steering gear of an automobile, to be used either as the sole steering means or jointly with the usual manually-operated steering rod or lever.

A further object of the present invention is to provide a novel form of valve by means of which the motive fluid may be conveniently and effectively controlled for the carrying out of the objects of my invention.

The invention will be hereinafter described and claimed in detail, and in such description reference will be had to the accompanying drawings forming a part of this application, and wherein like numerals of reference will be employed to indicate like parts throughout the different views of the drawings in which:—

Figure 1 is a plan view of a part of an automobile frame or chassis. Fig. 2 is a central horizontal sectional view through the air-guide cylinder and the controlling valve. Fig. 3 is a central vertical sectional view of the controlling valve, and Fig. 4 is a detail view in elevation of the worm gear of the steering mechanism.

The improvements constituting my invention reside in the provision of an air-guide cylinder, a controlling valve for the air, and a means for operating the steering gear by the utilization of compressed air as a motive fluid. These parts have been shown in detail, and will be fully described.

In the practice of the invention there must be provided, where compressed air is the motive fluid, a storage tank for the air and an air compressor. This I have illustrated only conventionally in Fig. 1 of the drawings, wherein 1 indicates the air compressor and 2 the air storage tank. The air compressor may be located at any suitable point on the automobile, and also suitably driven, and the air storage tank too may likewise be located at any suitable or convenient point on the automobile.

3 indicates the steering knuckles of the automobile which may be of the usual type. These knuckles are connected together by a rod 4, and one of the knuckles is connected to one end of the rod 5, the other end of which is attached to a crank 6 carried by shaft 7 on which is a gear 8 which meshes with a worm gear 9, the shaft of which carries a pinion 10. These elements just enumerated are mounted on a supporting bracket 11 suitably attached to the automobile frame.

The numeral 12 indicates what I herein term the air-guide cylinder. This cylinder is divided by a central partition 14 forming two compartments or cylinders 15, 16, in which are mounted the pistons 17, 18 respectively. The cylinders 15, 16 are in communication one with the other preferably by means of a tap pipe 19 communicating at its ends with the respective cylinders and carried around the air-guide cylinder as seen in Fig. 2 of the drawings, and the purpose of which will hereinafter appear. The pistons 17 and 18 are held and maintained a spaced distance from each other by means of guide-rods 20 connected together at their rear ends by cross head 21, and at their forward ends by cross head 22; cylinder flanges 21', 22' act as guides for said rods 20; these cross heads are connected to the rods of the pistons 17, 18 as seen in Fig. 2 of the drawings.

Connected to the cross head 22 is a gear rack 23 which meshes with the pinion 10, and, as the pistons are moved, imparts motion to the pinion 10, and through the medium of the worm 9, gear 8, crank 6, and rods 4, 5, and the steering knuckles 3, turns the front wheels of the automobile.

The air-guide cylinder is suitably separated from the automobile frame or chassis, and the admission of compressed air into the cylinders 15, 16 actuating pistons 17, 18 is controlled by means of a novel form of valve under the control of the driver of the automobile and having communication with the storage tank 2 and with the cylinders 15, 16.

In the accompanying illustration of my invention I have shown the controlling valve as arranged at one side of the air-guide cylinder and as having communication with the cylinders 15, 16 through pipes 24, 25, and ports 26, 27 in said cylinders 15, 16 respectively. The construction of the device is of course in practice not confined to that herein shown, the present construction being an operated one for the purpose of illustration.

The controlling valve comprises a four-way casing 28, the port 29 of which is in communication through pipe 24 and port 26 with cylinder 15, and port 30 of which casing is in communication through pipe 25 and port 27 with cylinder 16. Port 31 of said casing 28 is open to the atmosphere at times when it is not closed by the valve, while port 32 of said casing is in communication through pipe 33 with the storage tank 2.

The valve 34 in the present illustration shown as being of the plug type is seated in the valve opening of casing 28, and is cut away at four points on its periphery to form valve faces or lugs 29', 30', 31', and 32' respectively, by means of which the several ports 29, 30, 31, and 32 are controlled. The valve 34 is preferably held seated by the employment of any desirable form of lock nut 35 connected to the stem of the lower end of the valve. The stem 36 which connects with the upper end or head of the valve 34 constitutes the controlling rod or lever by means of which the valve is controlled by the driver of the machine. The lug 31' of valve 34 is provided with a transverse port 37, and lug 32' is provided with a similar transverse port 38, the function of which ports will appear in the operation of the device now to be given. The stem or rod 36 it will be understood is extended to a point within convenient reach of the driver of the machine, and is provided in practice with a suitable handle (not shown).

As shown in Fig. 2 of the drawings the valve is in position to close off the air from the reservoir 2.

Assuming now the valve is in position shown in Fig. 2 of the drawings, it will be observed that when the valve is turned towards the right, air enters from the reservoir 2 through pipe 33 and port 32 and through port 38, and out through port 30, pipe 25, and port 27 into the cylinder 16, moving the piston 18 in said cylinder. At the same time lug 29' cuts off the in-rushing air from cylinder 15 and opens this cylinder to the small exhaust port 31 through the port 37. When the machine has been turned in the desired direction, the valve 34 is actuated to again bring the same to the position shown in Fig. 2; and then turned at once to the left which brings the car in the desired place. When the valve 34 is turned to the left, the air in cylinder No. 16 is forced out through ports 37 and 31, and air from the reservoir passes in through ports 32 and 38, port 29, pipe 24, and port 26 into cylinder No. 15, moving piston 17 of said cylinder from the central partition 14; operating rod 36 is then again actuated to bring the same to rest position, and both cylinders are now charged and the machine in right position. Attention is called to the peculiar construction of this valve, and the functions which it performs and it will be observed that the single valve performs the functions practically of 16 independent valves, namely:—Lug 32' closes port 32 and also lets air into either pipe 24 or 25 after the ports to these pipes are opened by lugs 29', 30' respectively; lug 29' opens the port to the one cylinder, and cuts off in-rushing-air from the escape or exhaust port 31; it opens this cylinder to the exhaust and cuts off in-rushing from this cylinder and also keeps the air which charges that cylinder therein. The same is true with respect to lug 30'. Lug 31' excludes all natural air, but when air is turned into the cylinder 16 it opens the escape port 31 and lets air come out through escape port 37, and vice versa when the valve is turned in the opposite direction.

It will be observed that it will be impossible to guide the machine with any degree of ease, if both cylinders were not charged, as the machine would be jerked suddenly to the right or to the left, but with both cylinders charged and the small escape port or exhaust 31, the air acts as a cushion on the piston not in use, and allows the air to pass out slowly, (or rapidly if great pressure is turned on), and this compressed air cushion produces an equilibrium by means of which the machine may be guided instantly, safely, and with ease and grace.

In order to carry natural air from the end of cylinder 16 into the cylinder 15 when compressed air is let into cylinder 16, I provide the pipe 19. This will prevent the air in the front end of cylinder No. 16 and in the rear end of cylinder No. 15 from acting as a cushion when compressed air is turned on in either cylinder.

Without departing from the spirit of the invention disclosed herein it will be observed that various changes may be made in details of construction, such as the arrangement of the parts, and I therefore do not wish to confine myself to the construction shown, but claim the right to make such alterations and changes as may come clearly within the scope of the appended claims.

Having fully described my invention, what I claim as new, and desire to secure by Letters Patent is:

1. The combination with the running-gear of an automobile, of a reservoir for fluid under pressure, a fluid receiving cylinder divided into two compartments each in communication with the reservoir, pistons in said compartments of the fluid-receiving cylinder connected with the steering wheels, a steering-post, and a valve interposed between the fluid-receiving cylinder and the reservoir and controlled by said steering-post to admit air from the reservoir to said compartments of the fluid-receiving cylinder.

2. The combination with the running-gear of an automobile, of a storage reservoir for fluid under pressure, a fluid-receiving cylinder divided into compartments, a piston in each compartment, guide-rods connecting said pistons, connections establishing communication between each compartment of the cylinder and the storage reservoir, a valve interposed in said connections for controlling admission of fluid to the compartments of the cylinder, a steering-post connected to said valve, and mechanism connected to said pistons and to the steering-gear of the automobile, substantially as described.

3. The combination with the running-gear of an automobile, of a power device connected with the steering-wheels and comprising a fluid-receiving cylinder having separate compartments and pistons in each compartment, a storage-reservoir, connections between the storage-reservoir and the said cylinder, and a controlling valve interposed in said connections.

In testimony whereof I affix my signature in presence of two witnesses.

JAMES T. JOHNSON.

Witnesses:
J. T. SETTLE,
T. W. BRADFORD.